United States Patent [19]

Ljubman et al.

[11] 4,272,494

[45] Jun. 9, 1981

[54] METHOD FOR RECOVERING METALS OF GROUPS V–VI OF THE PERIODIC SYSTEM FROM SOLUTIONS AND PULPS

[76] Inventors: Nazar Y. Ljubman, ulitsa Dzhandosova, 166, kv. 38; Jury N. Svyadosch, ulitsa Tulebaeva, 139, kv. 19, both of, Alma-Ata, U.S.S.R.

[21] Appl. No.: 22,415

[22] Filed: Mar. 21, 1979

[51] Int. Cl.$^3$ .................. C01G 39/00; C01G 30/00; C01G 28/00; C01G 29/00
[52] U.S. Cl. .................................. 423/54; 423/87; 423/DIG. 14; 75/101 BE; 521/39
[58] Field of Search .............. 423/DIG. 14, 54, 87; 75/101 BE; 521/39

[56] References Cited

U.S. PATENT DOCUMENTS 2,873,170  2/1959  Hyde.

OTHER PUBLICATIONS

Smirnov et al., "Doklady Akademii Nauk SSSR", 1950, No. 3, pp.449–451.
Samuelson, "Ion Exchange Separations in Analytical Chemistry", John Wiley & Sons, N.Y. 1963, pp. 406–410, 421.
Kunin et al., "Ion Exchange Resins", John Wiley & Sons, N.Y. 1950, pp. 141–156.
Pennington et al., "Ind. and Eng. Chemistry", vol. 51, 1959, pp. 759–762.

*Primary Examiner*—Herbert T. Carter
*Attorney, Agent, or Firm*—Lackenbach, Lilling & Siegel

[57] ABSTRACT

The method for recovering metals of Groups V–VI of the periodic system from solutions and pulps according to the present invention is effected by means of a selective ion-exchange resin which is the reaction product between a polyhydric phenol with formaldehyde with a specific surface area of from 50 to 600 m$^2$/g, pore volume of from 0.2 to 2.3 cm$^3$/g, content of hydroxy groups of at least 11.3 mg-equiv/g.

8 Claims, No Drawings

METHOD FOR RECOVERING METALS OF GROUPS V–VI OF THE PERIODIC SYSTEM FROM SOLUTIONS AND PULPS

FIELD OF THE INVENTION

The present invention relates to the art of processing solutions and pulps by means of ion-exchange resins and, more particularly, it relates to a method for recovering metals of Groups V–VI of the periodic system from solutions and pulps.

The method according to the present invention is useful in ferrous and non-ferrous metallurgy, rare-metal metallurgy, purification of waste waters, in hydrometallurgical conversion of ore metals, conditioning of process liquors, and analytical chemistry.

BACKGROUND OF THE INVENTION

Known in the art are methods for recovering metals belonging to Groups V–VI of the periodic system which can be classified into three groups.

The first group includes methods based on the use of versatile ionites. Thus, U.S. Pat. No. 4,046,688 teaches the use of strongly-acidic cationites in the H-form for the removal of antimony from an aqueous solution, provided that antimony is present in the cation form, and from strongly-basic resins in the OH-form, provided that antimony is present in the anion form. This method, however, is not suitable for industrial liquors, wherein components capable of anionic and cationic exchange are present, as a rule, in considerable amounts.

The second group includes methods also based on the use of versatile ionites, with the only difference that the starting liquors are preliminary treated to convert the metal being recovered to the condition preferably for ion-exchange bonding. Thus, in U.S. Pat. No. 3,689,217 to ensure an enhanced sorption of arsenic on a strongly-basic anionite, the starting liquor is charged with chlorine-containing reagents such as hydrochloric acid or ammonium chloride in a molar excess of 10–200 relative to the amount of arsenic. Disadvantages of this method includes the necessity of performing the above-mentioned preliminary treatment which complicates the process.

The last group involves methods based on the use of special-purpose ionites selectively reacting with metals belonging to Groups V–VI of the periodic system. These methods have advantages residing in a high degree of recovery of said metals owing to the selective effect of the ionites employed. Thus, U.S. Pat. No. 3,887,460 teaches recovery of arsenic by means of ionites produced by conversion of preliminarily complexed reagents such as boron-containing complexes of salicylic or gallic acid to a polymeric structurized condition.

Despite the above-mentioned selectively, the above-mentioned ionites do not provide for a required depth of recovery of arsenic; the maximum possible degree of recovery of arsenic does not exceed 82%. The process of combining arsenic occurs quite slowly and it takes about 3 days to achieve the equilibrium. These disadvantages are possibly the result of the fact that in the preparation of ionites with the use of precomplexed monomers it is substantially impossible to efficiently and intentionally carry out structurization reactions with polymers to form the required reticulated three dimensional structures. Moreover, the above-described technique is unsuitable in the cases where monomers after coordination lose their reactivity in the processes of polymer formation.

In 1950 A. S. Smirnov and M. M. Bluvshtein proposed to use products of polycondensation of polyhydric phenols with formaldehyde for selective recovering of heavy metals (cf. "Doklady Akademii Nauk SSSR, 1950, No. 3, pp. 449–451).

The thus-proposed, sorbents, unfortunately, had an imperfect structure due to the formation thereof at elevated temperature and evaporation of water.

As a result, complexon radicals fixed in the three-dimensional reticulation of ionites become hardly accessible for the reaction of coordination bonding.

For this reason, ionites based on polyhydric phenols have not found a wide application hitherto and the attempts to practically realize the expected specificity and selectivity thereof have been unsuccessful.

Therefore, selective ionites of the prior art do not provide the required separation, i.e. a high degree and speed of recovery of metals.

SUMMARY OF THE INVENTION

It is an object of the present invention to increase selectivity, degree and rate of recovery of metals of Groups V–VI of the periodic system from solutions and pulp.

This object is accomplished in a method for recovering metals of Groups V–VI of the periodic system from solutions and pulps by means of an ion-exchange resin; In accordance with the present invention use is made of a product of interaction of a polyhydric phenol with formaldehyde with a specific surface area of from 50 to 600 m$^2$/g, pore volume of 0.2 to 2.3 cm$^3$/g, content of hydroxy groups of at least 11.3 mg-equiv/g.

The above-specified parameters of structure of an ion-exchange resin contribute to the selective bonding of metals of Groups V–VI, and increase the degree of recovery of said metals.

It is advisable to use, for recovery of arsenic, the above-mentioned resin with a specific surface area of from 300 to 600 m$^2$/g, pore volume of from 0.2 to 0.8 cm$^3$/g, the content of hydroxy groups of 11.5 mg-equiv/g. For recovery of antimony it is advisable to use the resin with a specific surface area of from 122 to 200 m$^2$/g, pore volume of from 1.0 to 1.4 cm$^3$/g, content of hydroxy groups of 11.3 mg-equiv/g. For recovery of bismuth it is advisable to use the resin with a specific surface area of from 400 to 600 m$^2$/g, pore volume of from 0.2 to 0.4 cm$^3$/g, the content of hydroxy groups of 18.5 mg-equiv/g. For recovery of molybdenum it is preferable to use the resin with a specific surface area of from 50 to 80 m$^2$/g, pore volume of from 1.8 to 2.3 cm$^3$/g, the content of hydroxy groups of 11.5 mg-equiv/g.

The use of the product of interaction of a polyhydric phenol such as pyrogallol or pyrocatechol with formaldehyde makes it possible to control selectivity of recovery of metals of Groups V–VI of the periodic system from solutions and pulps.

To increase the rate of recovery of said metals, it is desirable to use said resin in the form of particles with a size of from 0.25 to 1.00 mm. To simplify the process equipment (there is no need in drain means) and simultaneously increase the process rate, it is desirable to use said resin in the form of a shape article.

DETAILED DESCRIPTION OF THE INVENTION

The above-specified optimal parameters of the ionite are ensured by its synthesis by way of polycondensation of a polyhydric phenol and formaldehyde with retention of water in three stages. The first stage is carried out at a temperature within the range of from 50° to 80° C. for a period ensuring a 96-98% degree of conversion of the polyhydric phenol at a uniform condition of the polymer-forming system.

At this stage, the following process conditions should be maintained: pH 0.2-1.0; molar ratio between formaldehyde and polyhydric phenol of 1.2:1 to 3:1; weight ratio between water and the polyhydric phenol of 2:1 to 7:1. This stage is to be performed in a reactor provided with a stirrer and heater as well as a coil means for cooling the reaction mixture (removal of the excessive heat of the exothermal reaction), and cooling the reaction mixture prior to the second stage.

The second stage comprises cooling the polymer-forming mass and maintaining a temperature within the range of from 20° to 54° C. in a static condition in a sealed vessel with isolation of the polymeric components in the form of globules with a diameter of from 0.008 to 20 mcm. At this stage, when the reactions of phase conversion dominate, great attention should be paid to colloid-physical factors contributing to the formation of a stable aqueous dispersion of the polymeric component. On completion of this stage, an elastic polymeric block of ivory color is formed which contains the whole amount of the initially charged water uniformly distributed over its bulk.

The globules recovered in the second stage are fixed at a temperature within the range of from 70° to 90° C. for a period of from 10 to 60 hours in the form of a continuous reticulated structure of a non-syneresis character to give a solid brown block which is then crushed to particles with a diameter of from 0.25 to 1.0 mm. The process according to the present invention also stipulates the use of a selective ionite in the form of a shaped article. The second and third stages of the synthesis are performed in a reaction vessel of a particular shape. The use of a selective ionite in the form of a shaped article makes it possible to simplify the process equipment.

Some specific Examples illustrating the method according to the present invention are given hereinbelow.

EXAMPLE 1

Into a heated reactor provided with a stirrer, reflux condenser and a cooling coil there are charged the following components, parts by weight: pyrocatechol 460, formalin (a 35.6% per cent solution) 528, water 1,021, and hydrochloric acid (a 35.2% solution) 19.8. The reaction mixture is maintained at a temperature of 60° C. for two hours under stirring to give a transparent dark-cherry medium containing not over 3% of free pyrocatechol. Thereafter, heating is switched-off and cooling water is supplied into the coil to lower the reaction mixture temperature to 30° C. The mixture is then poured into a hermetically sealed vessel made of stainless steel and maintained under static conditions in a thermostat at a temperature of 30°±0.1° C. for the period of 24 hours. On completion of this stage the mixture is converted into an ivory-colored block containing the whole amount of the initially charged water uniformly distributed over its entire bulk.

The metal vessel with the polymeric block formed therein is placed into a thermal cabinet and maintained therein at a temperature of 80° C. for 10 hours. Then the vessel is cooled to room temperature and a solid hydrophilized block of brown color is extracted therefrom. This block is crushed to pieces of a diameter of 20-30 mm, washed with running water until no formaldehyde is detected in the washing water and dried in a thermal cabinet at a temperature of 80° C.for 6 hours to obtain a material containing about 8% moisture. The polymer is cooled to room temperature, crushed in a roll crusher and fractions of 0.25-1.0 mm are collected.

The thus-prepared sorbent has the following properties: the amount of hydroxy groups esterified by acetic anhydride is 11.5 mg-equiv/g of absolutely dry polymer; specific volume in the swollen condition is 4.4 ml/g; water-absorption is 2.3 g/g of absolutely dry polymer; pore volume 0.8 cm$^3$/g; specific surface area 300 m$^2$/g; static exchange capacity with respect to arsenic 220 mg/g; particle size 0.25 to 1.0 mm; mechanical strength 96%; osmotic stability 94% deformation stability 96%.

EXAMPLE 2

Through a column filled with 0.5 kg of the ionite prepared as in Example liters hereinabove there are passed 10 l of an electrolyte having the following composition, g/l: arsenic (III) 1.0; zinc 4.4; cadmium 0.1; iron 0.6; aluminum 0.7; fluorine 2.5; sulphuric acid 110, at the rate of 20 specific volumes per hour. An electrolyte is obtained therewith which has the following composition, g/l: arsenic (III) 0.03; copper 0.2: zinc 4.4; cadmium 0.1; iron 0.6; aluminum 0.58; fluorine 2.5; sulphuric acid 109, i.e. a 97% degree of purification from arsenic is obtained. Regeneration of the saturated ionite is performed by treatment with 10 l of hot water to give 1 liters of a concentrated solution containing 9.4 g/l of arsenic and 9 liters of a solution which is used in the following cycle of regeneration.

EXAMPLE 3

Into a 1.8 m$^3$ reactor provided with a stirrer and a pipe for admission of gaseous sulphur dioxide there are charged 1.5 liters of electrolyte having the following composition, g/l: arsenic (V) 8.3; copper 41.3; nickel 17.3; sulphuric acid 168. Sulphur dioxide is passed through the electrolyte for 30 minutes at the rate of 140 l/min under stirring. The treated electrolyte is filtered through the column charged with 60 kg of the ionite produced as in Example 1 hereinabove. After two hours an electrolyte is obtained having the following composition, g/l: arsenic 0.6; copper 41.2; nickel 17.1; sulphuric acid 172; i.e. a 92.7% degree of purification from arsenic (V) is obtained. Then, 6 m$^3$ of process water are passed through the column for 1 hour to give an elute containing, g/l: sulphuric acid 12; arsenic 1.9. This solution is treated with 15 kg of lime for 30 minutes under stirring, the cake comprising calcium arsenite is filtered-off and the solution is employed in the following purification cycle.

The regenerated ionite is used in the cycle of soprtion of arsenic from copper electrolyte treated with sulphur dioxide gas.

EXAMPLE 4

The process of preparation of the ionite is conducted in a manner similar to that described in Example 1 hereinbefore, except that hydrochloric acid is used in amount of 9.9 parts by weight (a 35.2% solution) and the second stage of the process is carried out at a temperature of 35° C. The resulting ionite has the following properties: the amount of hydroxy groups esterified by acetic anhydride 11.5 mg-equiv/g specific volume in the swollen condition 2.1 ml/g; water-absorption 2.9 g/g; pore volume 0.2 cm$^3$/g; specific surface area 600 m$^2$/g; particle size 0.25 to 1.0 mm; mechanical strength 97% osmotic stability 93%; deformation stability 95%. Through a column filled with 0.5 kg of said ionite there are charged 10 liters of an electrolyte having the following composition, g/l: arsenic (III) 1.0; copper 0.2; zinc 4.4; cadmium 0.1; iron 0.6; aluminum 0.7; fluorine 2.5; sulphuric acid 110—at the rate of 20 specific volumes per hour. In doing so, an electrolyte is obtained having the following composition, g/l: arsenic 0.01; copper 0.2; zinc 4.4; cadmium 0.1; iron 0.6; aluminum 0.58; fluorine 2.5; sulphuric acid 109, i.e. a 99% degree of purification from arsenic is attained. Regeneration of the saturated ionite is effected by treating same with 10 liters of hot water to give 1 liters of a concentrated solution containing 9.7 g/l of arsenic and 9 liters of a solution which is used in the following regeneration cycle.

EXAMPLE 5

Into a heated reactor provided with a stirrer, reflux condenser and a cooling oil there are charged, parts by weight: pyrocatechol 460; formalin (a 35.6% solution) 528, water 1,483 and hydrochloric acid (a 35.2% solution) 26.4. The reaction mixture is maintained at a temperature of 60° C. for 3 hours under stirring to give a transparent dark-cherry mixture contaiing not more than 3% of free pyrocatechol. Then heating is discontinued and cooling water is supplied into the cooling to lower the reaction temperature mixture of 40° C. The resulting mixture is poured into a hermetically sealed vessel and maintained in a static condition in a thermostat at a temperature of 40°±0.1° C. for 20 hours. On completion of this stage, the mixture is converted to an ivory-colored elastic block containing the whole amount of the initially charged water uniformly distributed over the entire bulk of the block.

The vessel with the polymeric block formed therein is placed into a thermal cabinet and maintained therein at a temperature of 80° C. for 12 hours. Then the vessel is cooled to room temperature and a solid brown-colored hydrophilized block is extracted therein and crushed to pieces of a size of 20 to 30 mm; these pieces are washed with running water until no formaldehyde is detected in the washing water and dried in the drying cabinet at a temperature of 80° C. for 6 hours to give a material containing about 8% moisture. The polymer is cooled to room temperature, crushed in a roll crusher and fractions with a particle size of from 0.25 to 1.0 mm are collected. The yield of this fraction is 78% as calculated for the charged pyrocatechol. The total yield of the polymer is 126% as calculated for the charged pyrocatechol.

The thus-produced sorbent has the following properties: amount of hydroxy groups esterified by acetic anhydride 11.3 mg-equiv/g of absolutely dry polymer; pore volume 1.4 cm$^3$/g; specific volume in the swollen state 5.3 ml/g; water-absorption 3.4 g of water per one g of absolutely dry polymer; specific surface area 122 m$^2$/g; static exchange capacity with resepct to antimony 460 mg/g, particle size 0.25 to 1.0 mm; mechanical strength 93% osmotic stability 94%; deformation stability 97% (percent of porosity variation is determined after 10 cycles of swelling-dehydration).

EXAMPLE 6

Through a column filled with 0.5 kg of the ionite prepared as in Example 5 hereinabove 150 liters of an electrolyte are passed having the following composition, g/l: antimony 0.8; arsenic 17, nickel 22, copper 52; iron 1.0; sulphuric acid 160 at the rate of 30 specific volumes per hour. A solution is obtained having the following composition, g/l: antimony 0.08; arsenic 16.8; nickel 22; copper 52; iron 1; sulphuric acid 158, i.e. a 90% degree of recovery of antimony is attained. Regeneration of the saturated ionite is ensured by treatment with 7.0 liters of a 20% hydrochloric acid to give 3 liters of a concentrated solution containing 34 g/l of antimony and 4 liters of a solution which is used in the following regeneration cycle.

EXAMPLE 7

To produce a shaped article, the synthesis is effected in a cylindrical vessel with an inner diameter of 96 mm and height of 80 mm provided with detachable lids. With the sealed lower end, a homogenized solution is charged into the vessel. The solution is prepared by mixing the following components, g: pyrocatechol 60, formalin (35.6%) 69, water 294.4 and hydrochloric acid (35.2%) 4.9. After charging the reaction mixture, the upper end of the vessel is sealed and the vessel is placed into a thermostat at the temerature of 51° C. After 48 hours, a layer of a polyphenolic ionite with a heigt of 56 mm strongly adherent to the walls is obtained in the vessel. Then the vessel is maintained in the thermostat at a temperature of 70° C. for 24 hours.

EXAMPLE 8

Through the ion-exchange filter produced as in Example 7 hereinabove there are passed 40 liters of an electrolyte having the following composition, g/l: antimony 0.8; arsenic 17, nickel 22 copper 52; iron 1.0; sulphuric acid 160 at the rate of 140 specific volumes per hour. A solution is thus produced which has the following composition, g/l: antimony 0.02; arsenic 17; nickel 22; copper 52; iron 1.0; sulphuric acid 158, i.e. a 90.8% degree of recovery of antimony is attained. Regeneration of the ion-exchange filter is effected by treating with 2.0 of a 20% hydrochloric acid to give 1.0 liter of a concentrated hydrochloric acid to give 1.0 liter of a concentrated solution containing 31 g/l of antimony and 1.0 liter of a solution which is employed in the following cycle of regeneration.

EXAMPLE 9

The synthesis of an ionite is effected in a manner similar to that described in Example 5, except that the following components are used in the amounts specified hereinbelow, parts by weight: water 1,250; hydrochloric acid 23.1; and the second stage of the process is carried out at a temperature of 44° C.

The resulting ionite has the following properties: the amount of hydroxy groups esterified by acetic anhydride is 11.3 mg-equiv/g of absolutely dry polymer; specific volume in the swollen condition is 3.8 ml/g; water-absorption 2.0 g/g of the absolutely dry polymer;

pore volume 1.0 cm³/g; specific surface area 200 m²/g; particle size 0.25-1.0 mm; mechanical strength 96%, osmotic stability 93%; deformation stability 95%. Through a column charged with 0.5 kg of this ionite there are passed 170 liters of an electrolyte having the following composition, g/l: antimony 0.8; arsenic 17; nickel 22, copper 52; iron 1.0; sulphuric acid 160 at the rate of 30 specific volumes per hour. The thus-obtained solution has the following composition, g/l: antimony 0.06; arsenic 16.6; nickel 16.6; nickel 22; copper 52; iron 1; sulphuric acid 155, i.e. a 92.5% degree of recovery of antimony is attained. Regeneration of the saturated ionite is effected by treating with 7.0 liters of a 20% hydrochloric acid to give 3 liters of a concentrated solution containing 39 g/l of antimony and 4 liters of a solution which is employed in the following regeneration cycle.

EXAMPLE 10

Into a heated reactor provided with a stirrer, reflux condenser and a cooling coil there are charged, parts by weight; pyrocatechol 40; pyrogallol 20; formalin (35.6%) 69; water 223 and hydrochloric acid (35.2%) 4. The reaction mixture is maintained at a temperature of 60° C. for 2 hours under stirring to give a transparent dark-cherry mixture containing at most 3% of a free polyhydric phenol. Then heating is discontinued and cooling water is supplied into the cooling coil to lower the reaction mixture temperature to 40° C. The mixture is poured into a hermetically sealed vessel and maintained in a static condition in a thermostat at a temperature of 40±0.1° C. for 32 hours. On completion of this stage the mixture is converted into an elastic block of ivory color.

The vessel with the polymeric block formed therein is placed into a thermal cabinet and maintained at a temperature of 80° C. for 10 hours. Then the vessel is cooled to room temperature and the resulting solid brown hydrophilized block is extracted therefrom. This block is crushed to pieces with a diameter of 20 to 30 mm, washed with running water until no formaldehyde is detected in washings and dried in a drying cabinet at a temperature of 80° C. for 6 hours to give a material containing about 8% of moisture. The polymer is cooled to room temperature, crushed in a roll crusher and the fraction of 0.25 to 1.0 mm particle size is collected.

The thus-prepared sorbent has the following properties: the amount of hydroxy groups esterified by acetic anhydride is 18.5 mg-equiv/g of absolutely dry polymer; specific volume in the swollen condition is 2.5 ml/g; water-absorption 3.6 g/g of absolutely dry polymer; pore volume is 0.4 cm³/g; specific surface area is 400 m²/g; mechanical strength 96% osmotic stability 94%; deformation stability 94%.

EXAMPLE 11

Through a column charged with 0.5 kg of the ionite prepared following the procedure described in the foregoing Example 10 there is passed 100 liters of a solution having the following composition, g/l: bismuth 0.3; antimony 0.6; sulphuric acid 180 at the rate of 30 specific volumes per hour to give a solution having the following composition, g/l: bismuth 0.01; antimony 0.02; sulphuric acid 171. Regeneration of the saturated ionite is effected by treatment with 10 liters of a 30% hydrochloric acid to give an eluate with the following composition, g/l: bismuth 2.9; antimony 5.6.

EXAMPLE 12

The synthesis of an ionite is performed following the procedure described in Example 10 hereinbefore, except that the following components are used in the amounts specified hereinbelow: water 210 parts by weight; formalin (35.6%) 75. The resulting ionite has the following properties: the amount of hydroxy groups esterified by acetic anhydride is 18.5 mg-equiv/g of absolutely dry polymer; specific volume in the swollen condition is 2.0 ml/g; water-absorption 1.7 g/g of absolutely dry polymer; pore volume 0.2 cm³/g, specific surface area 600 m²/g, particle size of 0.25 to 1.0 mm; mechanical strength 94% osmotic stability 93%; deformation stability 95%. Through a column filled with 0.5 kg of this ionite there are passed 130 liters of a solution having the following composition, g/l: bismuth 0.4; sulphuric acid 190 at the rate of 30 specific volumes per hour to give a solution of the composition as follows, g/l: bismuth 0.01; sulphuric acid 180, i.e. a 97.5% degree of recovery of bismuth is ensured. Regeneration of the saturated ionite is effected by treatment with 10 liters of a 30% solution of hydrochloric acid with the formation of an eluate containing bismuth in the amount of 4.9 g/l.

EXAMPLE 13

Into a heated reactor provided with a stirrer, a reflux condenser and a cooling coil there are charged, parts by weight: pyrocatechol 460, formalin (35.6% solution) 528; water 1,839 and hydrochloric acid (35.2% solution) 33.1. The reaction mixture is maintained at a temperature of 80° C. for 50 minutes under stirring. Then heating is discontinued and cooling water is supplied into the cooling coil to lower the reaction mixture temperature to 45° C. The reaction mixture thus-prepared is poured into a hermetically sealed vessel and maintained in a static state in a thermostat at a temperature of 45±0.1° C. for 18 hours. On completion of this stage the mixture is converted to an elastic white-pink block.

The metal vessel with the polymeric block formed therein is transferred to a thermal cabinet and maintained therein at a temperature of 80° C. for 10 hours. Then the vessel is cooled to room temperature and a solid brown hydrophilized block is extracted therefrom. This block is crushed to pieces of a diameter of from 20 to 30 mm, washed with running water until no formaldehyde is detected in the washings and dried in a thermal cabinet at a temperature of 80° C. for 6 hours to give a material containing about 8% moisture. The polymer is cooled to room temperature, crushed in a roll crusher and the fraction with a particle size of from 0.25 to 1.0 mm is collected.

The thus-prepared sorbent has the following properties: the amount of hydroxy groups esterified with acetic anhydride is 11.5 mg-equiv/g of the absolutely dry polymer; specific volume in the swollen condition is 5.8 ml/g; water-absorption is 4.6 g water per one g of the absolutely dry polymer; maximum pore volume 1.8 cm³/g; specific surface area 80.0 m²/g particle size 0.25 to 1.0 mm; mechanical strength 92%; osmoric stability 97% deformation stability 99%.

EXAMPLE 14

Through a column packed with 0.5 kg of the ionite prepared in the foregoing Example 13 a solution is passed having the following composition, g/l: molybdenum 2.0; rhenium 0.41; sulphuric acid 100, at the rate of 30 specific volumes per hour. In doing so, 140 liters of a solution are obtained having the following composition, g/l: molybdenum 0.18; rhenium 0.41; sulphuric acid 100; i.e. the method according to the present invention makes it possible to perform separation of molybdenum and rhenium.

EXAMPLE 15

The synthesis of an ionite is effected following the procedure described in the foregoing Example 13, except that hydrochloric acid is used in an amount of 43 parts by weight (35.2% solution). The resulting ionite has the following properties: the amount of hydroxy groups esterified by acetic anhydride is 11.5 mg-equiv/g; specific volume in the swollen condition is 6.4 ml/g; specific surface area 50 $m^2/g$; water-absorption 5.0 g/g; maximum pore volume 2.3 $cm^3/g$; particle size 0.25 to 1.0 mm; mechanical strength 91%; osmotic stability 97% deformation stability 99%. Through a column packed with 0.5 kg of this ionite there are passed 140 liters of a solution having the following composition, g/l: molybdenum 2; rhenium 0.41; sulphuric acid 100 at the rate of 30 specific volumes per hour. A solution is thus prepared containing, g/l: molybdenum 0.2; rhenium 0.41; sulphuric acid 100; i.e. the 90% degree of recovery of molybdenum is attained with a simultaneous complete separation thereof from rhenium.

EXAMPLE 16

An anode slurry of a copper-refining process of an enterprise, comprising 7.7% of antimony, 44.2% of copper, 14.2% of nickel, 6.4% of arsenic (V), 0.5% of gold and 2.4% of silver is subjected to sorption leading with the aid of an iconite synthesized by following the procedure described in the foregoing Example 5. The process is conducted in an apparatus having a capacity of 10 liters. The apparatus is charged with a suspension of anode slurry (the weight of the slurry for the absolutely dry product being 1.3 kg) in a copper electrolyte (the composition of the copper electrolyte being such as set forth in the foregoing Example 6). The S/L ratio in the suspension is 1:5.

0.15 kg (for the absolutely dry weight) of an ionite synthesized by following the procedure described in the foregoing Example 5 is introduced into the suspension.

Live steam and pressurized air are supplied into the apparatus at rates ensuring stirring of the pulp and maintaining the temperature within 60° to 70° C.

After a period of 2 hours the pulp is drained onto a filter with the mesh size of the filter cloth being 0.2 mm; the ionite remaining on the filter is washed off the slurry with water.

The analysis of the ionite and slurry shows the content of antimony in the ionite to be 142 mg/g and the content of antimony in the slurry to be reduced to 0.6%.

Antimony is eluted from the ionite with a 20% hydrochloric acid the result being 5 liters of a concentrated eluate containing 33 g/liter of antimony, and 6 liters of a solution which is used in a subsequent regeneration cycle.

What is claimed is:

1. A method for recovering metals selected from the group consisting of arsenic, antimony, bismuth, and molybdenum from a sulfate solution containing said metals which comprises:

polycondensation of a polyhydric phenol and formaldehyde, with the retention of water in three stages, to form a selective ion exchange resin;

conducting the first stage at a temperature of about 50° to 80° C., with stirring, at a pH of about 0.2 to 1.0, at a molar ratio of formaldehyde to polyhydric phenol of about 1.2–3:1, and a weight ratio of water to polyhydric phenol of about 2–7:1, for a time sufficient to ensure a 96 to 98% conversion of the polyatomic phenol;

conducting the second stage at a temperature of about 20° to 54° C. to ensure recovery of a polymeric product in sizes of about 0.008 to 20 microns;

recovering said polymeric product in the third stage and heating it in a sealed vessel at a temperature of about 70° to 90° C. for about 10 to 60 hours to complete formation of the ion exchange resin; and contacting said sulfate solution containing said metals with said ion exchange resin.

2. A method for recovering arsenic according to claim 1, wherein said resin has a specific surface area of from 300 to 600 $m^2/g$, pore volume of from 0.2 to 0.8 $cm^3/g$, and content of hydroxy groups of 11.5 mg-equiv/g.

3. A method for recovering antimony according to claim 1 wherein said resin has a specific surface area of from 122 to 200 $m^2/g$, pore volume of 1.0 to 1.4 $cm^3/g$, and content of hydroxy groups of 11.3 mg-equiv/g.

4. A method for recovering bismuth according to claim 1, wherein said resin has a specific surface area of from 400 to 600 $m^2/g$, pore volume of from 0.2 to 0.4 $cm^3/g$, and content of hydroxy groups of 18.5 mg-equiv/g.

5. A method for recovering molybdenum according to claim 1, wherein said resin has a specific surface area of from 50 to 80 $m^2/g$, pore volume of from 1.8 to 2.3 $cm^3/g$, and content of hydroxy groups of 11.5 mg-equiv/g.

6. A method according to claim 1, wherein said resin is used in the form of particles with a size of from 0.25 to 1.00 mm.

7. A method according to claim 1, wherein said resin is used in the form of a shaped article.

8. A method according to claim 1, wherein said polyhydric phenol is selected from the group consisting of pyrogallol, pyrocatechol, and mixtures thereof.

* * * * *